J. A. TILDEN.
METER SYSTEM.
APPLICATION FILED NOV. 11, 1912.

1,154,896.

Patented Sept. 28, 1915.
2 SHEETS—SHEET 1.

Witnesses:
James E. Lynch
John Hynes

Inventor:
James A. Tilden
by Sylvanus H. [illegible]
Atty.

J. A. TILDEN.
METER SYSTEM.
APPLICATION FILED NOV. 11, 1912.
1,154,896.
Patented Sept. 28, 1915.
2 SHEETS—SHEET 2.
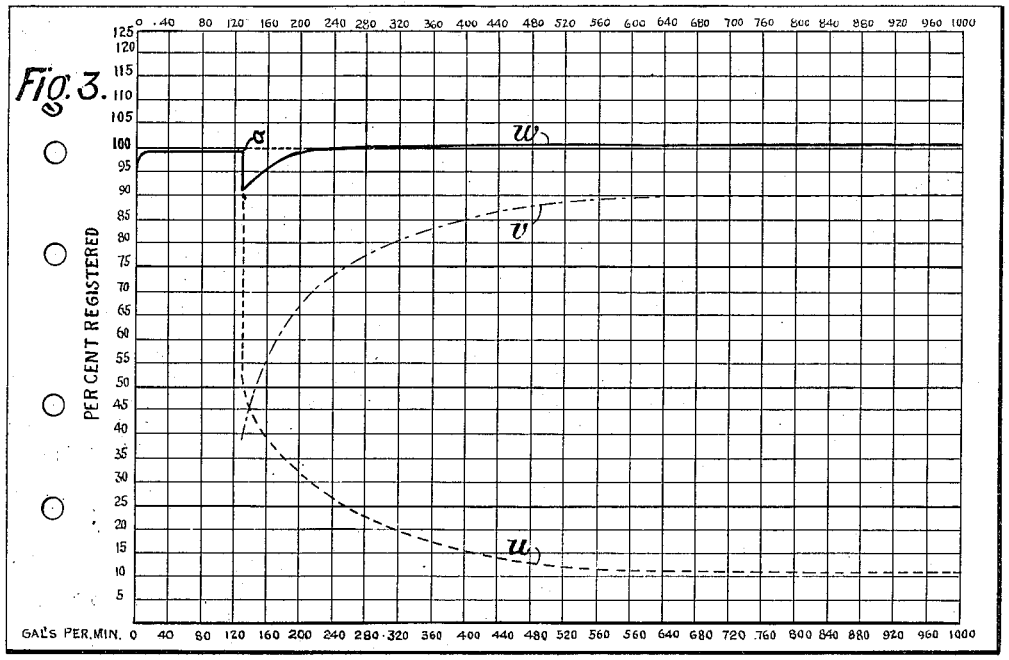
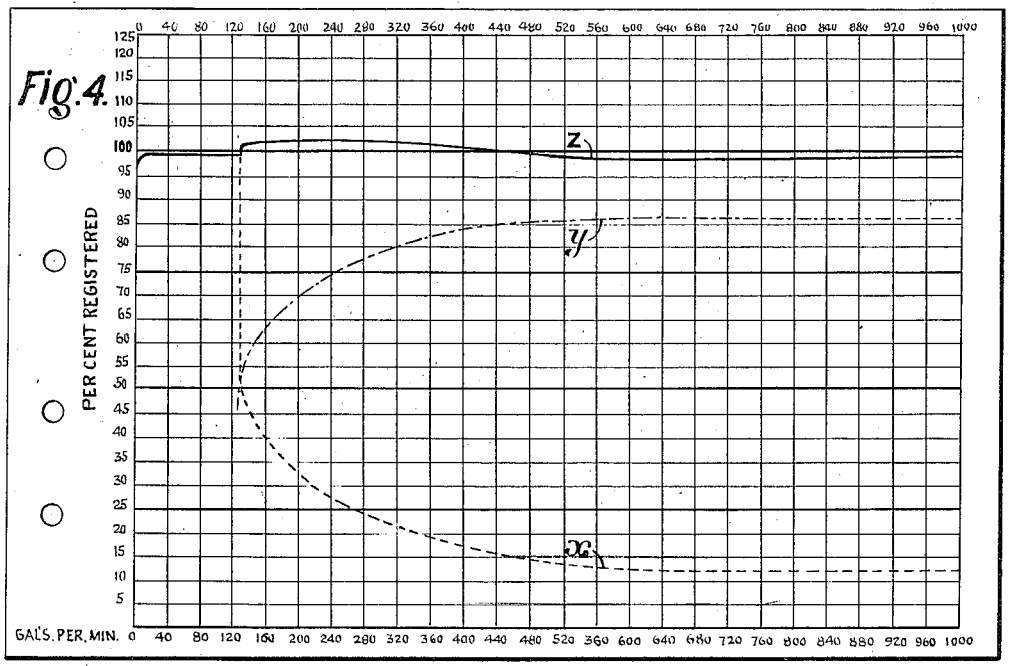
Witnesses:
James E. Lynch.
John Hynes.
Inventor:

UNITED STATES PATENT OFFICE.

JAMES A. TILDEN, OF BOSTON, MASSACHUSETTS.

METER SYSTEM.

1,154,896.  Specification of Letters Patent.  Patented Sept. 28, 1915.

Application filed November 11, 1912. Serial No. 730,547.

*To all whom it may concern:*

Be it known that I, JAMES A. TILDEN, a citizen of the United States, residing at Boston, in the county of Suffolk and State of Massachusetts, have invented a new and useful Meter System, of which the following is a specification.

The present invention relates to systems for measuring fluids, and its principal object, broadly expressed, is to provide means for controlling the flow of fluid through a plurality of measuring passages, such controlling means being common to all.

The invention may be applied to a system of the character described in my Patent No. 971,510, dated September 27, 1910, and in this connection, as will hereinafter more fully appear, it serves to temporarily change the ratio of flow through the main and by-passages of a proportional meter.

Figure 1:
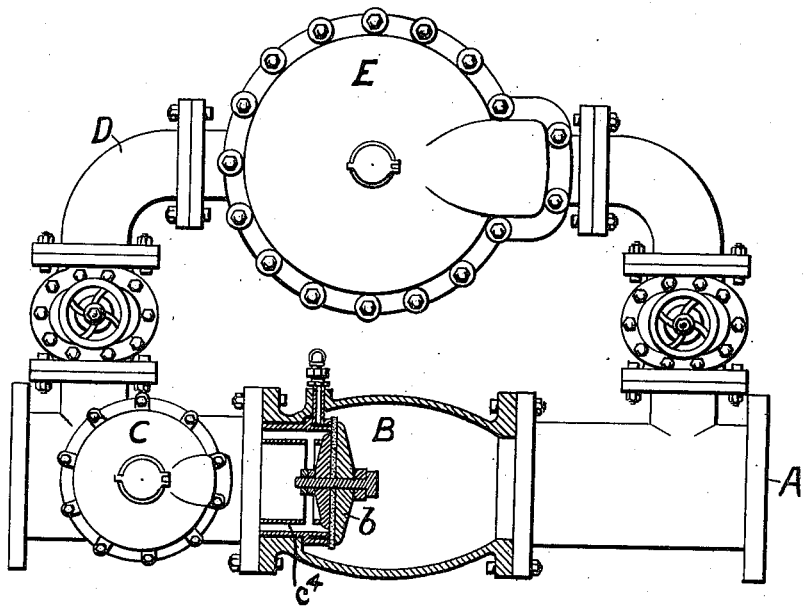
Figure 2:
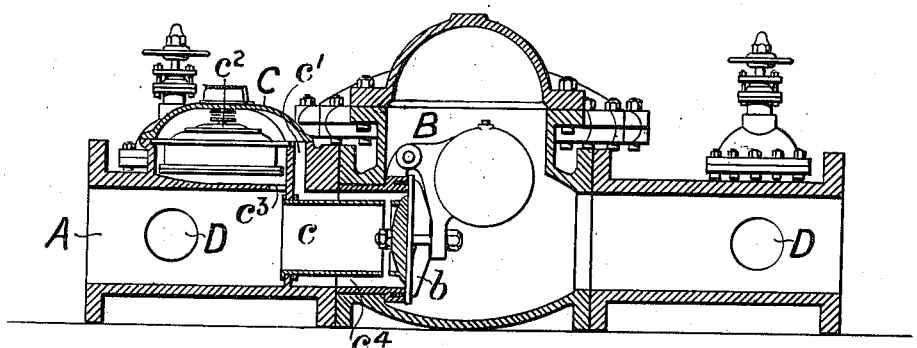

In the accompanying drawings, in which such an embodiment of the invention is illustrated, Figure 1 is a top plan view thereof; Fig. 2 is a vertical section taken along the axis of the main conduit; Fig. 3 shows three curves graphically expressive of the operation of the meter system disclosed in the hereinbefore mentioned patent; and in Fig. 4 appear similar curves for the present invention.

My patented meter system comprises, briefly, a main pipe or conduit A containing an automatic device for controlling fluid-flow, preferably in the form of a check-valve B, consisting of the usual casing and clapper or movable member $b$ mounted therein, and also including a proportional meter C. A by-pass D conducts fluid by the valve B when the movable member $b$ of the latter contacts with its seat, this continuing as long as the rate of flow through the by-pass is insufficient to produce differential pressure between the opposite faces of the member $b$ great enough to unseat it. Such relatively small flows are measured by a suitable meter E in the by-pass D. The proportional meter C comprises a resistance device $c$, situated in the main conduit and diverting a predetermined portion of the total fluid traversing the conduit through the secondary by-pass or passage $c'$ of meter mechanism $c^2$. This passage opens at $c^3$ on the induction-side of the resistance device and discharges at $c^4$ upon the opposite side. The proportional meter measures excess or emergency flows beyond the capacity of the meter E.

Meter systems as thus far described are at times liable to register inaccurately for the following reasons: When upon an increase in the rate of flow the check-valve D opens on account of a decrease of head through the by-pass due to frictional losses, the mechanism $c^2$ of the proportional meter C does not, because of the inertia and friction of its moving parts, begin to register as promptly as the by-pass meter E ceases operation. In consequence there is a period during which but a portion of the fluid-flow is measured.

The conditions existing under these circumstances are well illustrated by the diagram of Fig. 3. Here the curves $u$ and $v$ are plotted with gallons per minute as abscissæ and percentages of registration as ordinates, and correspond, respectively, to the meter mechanisms E and $c^2$. As shown by the curve $u$, meter E, after fully started in operation, registers the entire quantity of fluid passing until the critical point $o$ is reached, at which the check-valve opens. Thereupon the registration falls off, first rapidly then more slowly, until a minimum is attained when the check-valve opening is a maximum. The curve $v$ starts from zero percentage, and, though coming with comparative quickness to a maximum, is less steep in its inclination just beyond the critical point than the curve $u$ for the reasons previously stated. The effect upon the meter system as a whole is best illustrated by the curve of total registration $w$, obtained by adding the ordinates of the curves $u$, $v$. Instead of being a horizontal line, as it should to give accurate measurement it is first somewhat below the full value, because of the resistance of the meter E to starting (this error, however, being so small as to be negligible). Upon reaching the maximum it continues horizontally to the critical point, drops sharply as the meter $c^2$ lags, then rises gradually to the maximum again as this meter takes up its full work. The unmeasured fluid-flow is represented by the generally triangular area between the dotted continuation of the maximum registration line and the depression in the curve.

To correct the above defect I apply the principle of simultaneous control of plural measuring passages to the system of Patent No. 971,510 in the following manner: The resistance device is extended toward the valve member $b$ so that its eduction-opening is in close proximity to said member, it thus becoming tubular. About the resistance-tube and between it and the inner wall of the main conduit an annular passage is left, this furnishing the portion $c^4$ of the passage for the meter mechanism $c^2$, previously referred to. This annular portion is closed from the main conduit at the end toward the induction-opening $c^3$, but communicates with this passage as it opens from the meter mechanism. Thus the eduction-opening of the meter-passage is also closely adjacent to the member $b$. Though in the particular embodiment of the invention here illustrated there is a slight space between the end of the resistance-tube and valve member both the flow through the resistance device and the passage $c'$ are under the direct influence of the valve.

It will be observed that with this arrangement, as the member $b$ first leaves its seat, a relatively greater effective area of the passage $c'$ is opened than of the resistance-tube, disproportionately increasing the frictional resistance through the latter and thus temporarily destroying the true proportional flow through the passages of the meter C, which would give a correct registration of the quantity of fluid traversing the conduit. Until the critical point in the rate of flow has been somewhat past, this adds to the proportion of flow through the meter mechanism $c^2$, and by properly varying the cooperative relation of the resistance-tube and valve member, from actual contact to a greater or less degree of separation, this increase may be made to compensate for the tendency of the meter $c^2$ to lag in its starting with respect to the stopping of meter E. The effect of this application of my invention is shown graphically in Fig. 4, in which the curves $x$, $y$, $z$ represent the new conditions similarly to $u$, $v$, $w$, of Fig. 3. The curves $x$ of meter E and $y$ of meter $c^2$ fall and rise from the critical point at the same rate, one being approximatetly a reversed duplicate of the other. In consequence the curve $z$ of aggregate registration becomes, save for the slight initial starting depression, substantially a straight line, showing that all the fluid conducted by both the main conduit and by-pass are registered by the system.

For the purpose of making my invention clear, I have specifically described one application thereof, but it is to be understood that it is limited to this embodiment only as far as may be required by the terms of the following claims:

1. In combination, a conduit, a resistance device therein, a meter provided with a passage opening into the conduit at opposite sides of the resistance device, and a valve having a portion movable in the conduit and cooperating with the meter-passage and being adapted to open and close the conduit and in closing the conduit to obstruct the meter-passage.

2. A conduit, a valve having a movable portion situated in the conduit, a meter having a passage connected with the conduit, and a resistance device in the conduit, said resistance device and meter-passage extending into proximity with the same movable portion of the valve, whereby the relation of flow through the resistance device and meter-passage is varied.

3. A meter system comprising a conduit, a resistance-tube of less diameter than the conduit, a meter having a passage opening into the conduit at opposite extremities of the resistance-tube, and a check-valve provided with a movable member which in its closed position is situated in close proximity to one end of the resistance-tube.

4. A conduit, a valve and a resistance device in the conduit, and a meter having a passage connected with the conduit, said passage being located within and extending along said conduit toward the valve and one of the walls of the passage being furnished by the resistance device.

Signed at Boston, in the county of Suffolk and State of Massachusetts, this ninth day of November, 1912.

JAMES A. TILDEN.

Witnesses:
 FRANCIS C. HERSEY, Jr.,
 HENRY D. WINTON,